(12) United States Patent
Schön

(10) Patent No.: US 9,069,163 B2
(45) Date of Patent: Jun. 30, 2015

(54) HEAD-UP DISPLAY WITH BRIGHTNESS CONTROL

(75) Inventor: Peter Schön, Jönköping (SE)

(73) Assignee: SAAB AB, Linköping (SE)

( * ) Notice: Subject to any disclaimer, the term of this patent is extended or adjusted under 35 U.S.C. 154(b) by 1294 days.

(21) Appl. No.: 12/388,631

(22) Filed: Feb. 19, 2009

(65) Prior Publication Data

US 2009/0213037 A1 Aug. 27, 2009

(30) Foreign Application Priority Data

Feb. 19, 2008 (EP) ..................................... 08151622

(51) Int. Cl.
 *G09G 5/00* (2006.01)
 *G02B 27/01* (2006.01)

(52) U.S. Cl.
 CPC ........ *G02B 27/01* (2013.01); *G02B 2027/0118* (2013.01); *G02B 2027/014* (2013.01); *G02B 2027/0141* (2013.01)

(58) Field of Classification Search
 CPC ................. G02B 2027/0118; G02B 2027/014; G02B 2027/0141; G02B 27/01
 USPC .................................. 359/15; 345/204, 207, 7
 See application file for complete search history.

(56) References Cited

U.S. PATENT DOCUMENTS

| 4,603,319 A * | 7/1986 | Hinn .............................. 345/204 |
| 4,977,401 A * | 12/1990 | Sjoberg .......................... 340/975 |
| 4,997,263 A | 3/1991 | Cohen et al. |
| 5,596,451 A | 1/1997 | Handshcy et al. |
| 5,949,331 A * | 9/1999 | Schofield et al. ............. 340/461 |
| 7,015,876 B1 | 3/2006 | Miller |
| 2001/0008394 A1 | 7/2001 | Kanamori |
| 2004/0066547 A1* | 4/2004 | Parker et al. ..................... 359/15 |
| 2004/0252940 A1* | 12/2004 | Atac et al. ........................ 385/31 |

(Continued)

FOREIGN PATENT DOCUMENTS

| EP | 1798587 A | 6/2007 |
| JP | 2-227340 | 9/1990 |

(Continued)

OTHER PUBLICATIONS

European Search Report—Aug. 6, 2008.

*Primary Examiner* — Quan-Zhen Wang
*Assistant Examiner* — Tony Davis
(74) *Attorney, Agent, or Firm* — Venable LLP; Eric J. Franklin

(57) ABSTRACT

A head-up display system suitable for an aircraft. The head-up display including an image source arranged outside the desired field of view of an observer and where the intensity of symbols of the image source are modulated differ depending on their perceived position relative to the horizon line. A light source is arranged for providing light to an image source which is arranged to modulate the light of the light source thereby creating an image for the head up display. A brightness control unit have inputs for vehicle pitch- and roll angle, and a calculator configured to calculate, based on the pitch and roll angles, the current position in the image of a virtual horizon line, corresponding to the real horizon line as perceived by the observer, and for controlling the brightness of symbols above the virtual horizon line to be different from the brightness of symbols below the line.

7 Claims, 7 Drawing Sheets

(56) References Cited

U.S. PATENT DOCUMENTS

2006/0103590 A1    5/2006  Divon
2006/0241821 A1*  10/2006  Hrabak et al. .................. 701/3
2007/0018887 A1    1/2007  Feyereisen et al.
2008/0218501 A1*   9/2008  Diamond ..................... 345/207

FOREIGN PATENT DOCUMENTS

KR        20040019453         3/2004
WO     WO-2007/092013 A    10/2006

* cited by examiner

HEAD-UP DISPLAY WITH BRIGHTNESS CONTROL

CROSS-REFERENCE TO RELATED APPLICATIONS

This application claims priority to European patent application 08151622.1 filed 19 Feb. 2008.

FIELD OF INVENTION

The present invention relates to optical presentation devices and sights. In particular it relates to head-up displays and ways to control symbol brightness of the image shown in the display.

BACKGROUND

Head-up displays and sights available on the market today present a large size and an expensive price tag. This makes them unsuitable for small aeroplanes and helicopters. Most displays have no particular method for handling with different contrast between superimposed symbols and the outside view.

U.S. Pat. No. 5,596,451 disclose an assembly for producing a visual display including a light-reflecting type spatial light modulator and illumination arrangement for providing a particular source of light.

U.S. Pat. No. 7,015,876 disclose a head-up display for a vehicle which is in contrast to the windshield behind the display. In one embodiment the windshield is tinted to be in contrast with the colour of the head-up display. In other embodiments, the image forward of the vehicle is captured and sent to a control for the head-up display. The head-up display is then modified to be in contrast with the environment approaching the vehicle.

JP 2227340 discloses means for changing a display method according to a state of forward sight observed by a forward sight observation means, in a head-up display. A signal processing part processes information being inputted out of the outside, and determines type, colour, brightness or a display position of a symbol to be displayed to an operator, thereby outputting a signal requisite for the display toward a cathode-ray tube. In addition, forward sight photographed by a colour camera is subjected to picture processing, and when a colour of a symbol to be displayed is the same as the forward sight, the signal processing part changes the display position to a position where contrast is easy to recognize.

US 2006,103,590 disclose a mobile display system for a vehicle wherein a light source changes its intensity according to said vehicles driver's field of view light conditions.

KR 2004,019,453 disclose a device for adjusting colour and brightness of a head-up display comprising a charge coupled device (CCD) camera for monitoring display figures and a control unit for computing colour and brightness of the head-up display by the change of a front scene monitored by the CCD camera and for generating and outputting a control signal.

US. 2007,018,887 disclose a display system shoving semi-transparent polygons blended with the display's background terrain colour, but these polygons can change colour and be highlighted to match standard awareness and warnings as threat status is changed.

US 2006,024,1821 disclose a processor configured to control an LCD projection unit during unusual attitude of an aircraft to produce an attitude indicator of the aircraft and a horizon symbol. The horizon symbol divides the attitude indicator into a first region having a first display characteristic and a second region having a second display characteristic different from the first display characteristic.

US 2001,008,394 disclose a head-up display having a light source which intensity is adjusted to match a detected intensity of ambient light and the luminance of the light source is controlled depending on the ambient intensity and the light-controlled illumination.

U.S. Pat. No. 4,977,401 discloses a head-up display for indicating the attitude and flight path angle vertically, the attitude in roll and preferably the heading attitude and heading track angle of a vehicle. The indicated information is shown as if the aircraft with the display is located in the centre of an imaginary, space stable sphere with latitude circles and meridian markings.

There is a need for low-price, non-bulky head-up displays suitable for use in small vehicles such as small aeroplanes and helicopters, and which has a system for providing good contrast between generated symbols and the background terrain colour.

One object of the present invention is therefore to provide a head-up display system which include means for providing good contrast between generated symbols and the background terrain intensity and colour, and preferably not adding substantial costs to the head-up display system.

SUMMARY

In a vehicle provided with a head up display system, an observer, usually a pilot, observes the outside world through a windscreen and a head-up display arranged in his or her forward line of sight. A light ray from a distant object passes the windscreen and then the head up display before it reaches an eye of the observer. Symbols of an image source are reflected to a transparent combiner mirror of the head up display and appear for the observer to be located at infinity (may depend on the particular head up display used). However, a problem that may occur is that the outside world comprises objects that are different in colour and brightness, which makes some of the symbols easy to see. On the other hand, some symbols may be very hard to see, because the contrast is very low.

The inventor has realized that it is possible to contemplate this problem of brightness contrast between the outside world and the superimposed symbols of the head up display as a problem of what are above and below a horizon line.

In a daylight case symbols above the horizon line are shown against a background of sky. Symbols below the horizon line are shown against a background of dark blue sea or dark green forest, or some other terrain colour, usually markedly less bright than the sky.

In a night vision case, the overall brightness is lower but the system can still provide a marked difference in brightness between portions of a field of view of the head up display that corresponds to the sky, and portions of the field of view that corresponds to ground. The head up display system is preferably provided with means for turning this function of different intensity of symbols above and below the horizon on and off such that the pilot can, at his own volition, choose to make use, or not to make use of said function.

In a vehicle such as an aircraft, may it be a plane or a helicopter, the position of the horizon line in the head up display is not fixed. Depending on pitch angle and altitude the horizon line is shifted in an up-down direction, and depending on the roll angle the horizon line becomes inclined as viewed on the head up display.

The inventor also proposes a solution to adjust the brightness of symbols to be different depending on their position relative to the position of the horizon line on the head up display.

The head-up display system may further comprise an overall brightness control arrangement, where an environmental luminance is measured and the brightness of the image source is adjusted accordingly.

The head-up display system may further comprise an ambient light sensor and an algorithm making use of the sensor readings from said sensor for controlling the relation between the intensity of the image above and below the horizon. The algorithm is a function of the ambient luminance, generating the relation between the intensity levels.

According to a first aspect the application discloses a head-up display system for a vehicle comprising:

an projector part positioned outside the desired field of view of an observer and;

a partially reflecting combiner arranged in the field of view of the observer to provide for an image of the projector part to be combined with the view of the outside terrain thereby providing the observer with a view of the outside terrain with symbols superimposed thereto where the system further comprises:

a light source for providing light of the projector part;

an image generator display for modulating the light of the light source thereby creating an image to be combined with the view of the outside terrain;

an image generator controller having a brightness control unit arranged to provide different brightness of different portions of the image, where the brightness control unit have inputs for vehicle pitch angle and roll angle, and altitude, and are provided with means for calculating, based on said pitch and roll angles, and altitude, the position in the image of a virtual horizon line, corresponding to the real horizon line as perceived by the observer, and for calculating which portions of the image that is above said virtual horizon line, and which portions that are below the virtual horizon line; and where the brightness control unit can control the brightness of symbols above said virtual horizon line to be different from the brightness of symbols below the virtual horizon line. According to a second aspect, the image generator display may be a Digital Micro-mirror Device. The brightness control unit may be arranged to control pulse modulation of the Digital Micro-mirror Device.

According to a third aspect, the head up display system image generator display may be a Liquid Crystal Display. The brightness control unit may be arranged to control the transmittance for each pixel of the Liquid Crystal Display.

According to a fourth aspect, there is provided a head-up display-symbol intensity control method for providing symbol intensity adjustment for symbols of a head up display comprising the following steps:

Calculating a position of a virtual horizon line on a head up display;

Translating the position of virtual horizon line on the head up display to a corresponding position on an image source display;

Determining which area of the image source display that corresponds to the area above the virtual horizon line, and which area that corresponds to the area below the virtual horizon line.

Modulating the image source to display symbols in the area above virtual horizon line with a different intensity than the image source is modulated to display symbols in the area below the horizon line.

According to a fifth aspect, there is provided the intensity control method as recited above where the difference in intensity is generated as a function being dependent on the ambient light conditions.

BRIEF DESCRIPTION OF THE DRAWINGS

Other features of the invention will be more apparent upon consideration of the following description and of the accompanying drawings, wherein.

DESCRIPTION OF PREFERRED EMBODIMENTS

In a general embodiment, the invention concerns a head-up display system for a vehicle comprising an image source arranged outside the desired field of view of an observer and where the intensity of displayed symbols are different depending on their perceived position relative to the horizon line. A partially reflecting combiner is arranged in the field of view of the observer to provide for an image of the image source to be combined with the view of the outside terrain.

A light source is arranged for providing light to an image source. The image source may comprise an LCD or a Digital Micro-mirror Device that is arranged to modulate the light of the light source thereby creating an image to be combined with the view of the outside terrain.

A brightness control unit is arranged for controlling modulation of the LCD or the Digital Micro-mirror Device to provide different brightness of different portions of the image. In the case of LCD display the brightness control unit is arranged to control the transmittance for each pixel of the LCD. The brightness control unit has inputs for vehicle pitch angle and roll angle, and are provided with means for calculating, based on said pitch and roll angles, the position in the image of a virtual horizon line, corresponding to the real horizon line as perceived by the observer.

The brightness control unit is also provided with means for calculating which portions of the image that is located above said virtual horizon line, and which portions that are located below the virtual horizon line. The brightness control unit controls, based on the mentioned calculations, the brightness of symbols above said virtual horizon line to be different from the brightness of symbols below the virtual horizon line.

Figure 1A:
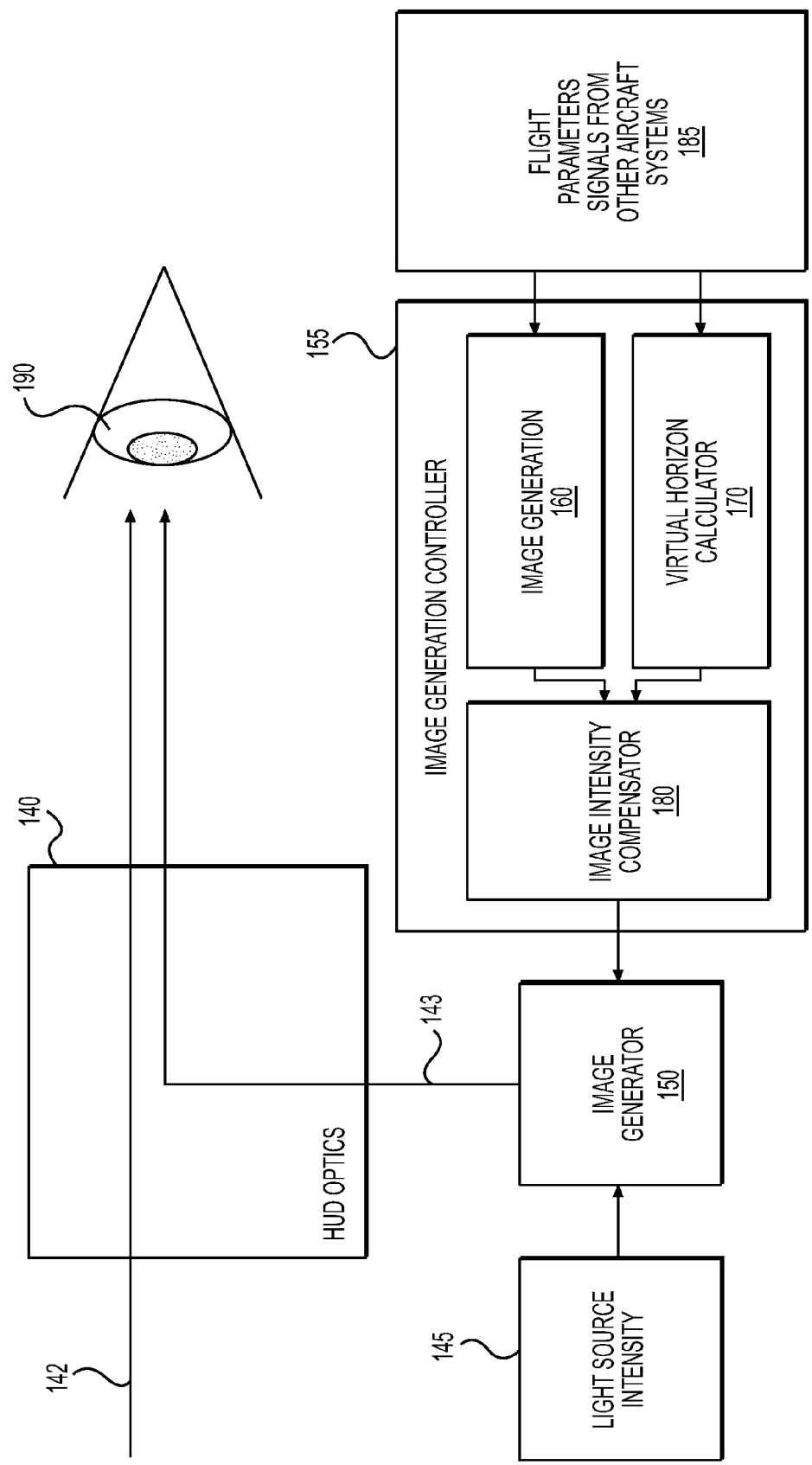
FIG. 1a shows an overview of a brightness control system for a head up display according to a first embodiment of the invention.

FIG. 1a shows a system layout of a display system in accordance with a first embodiment of the invention. An image generator 150 is controlled from two separate control units, the control units being a light source intensity control unit 145 and an image intensity compensator 180. The light source intensity control unit 145 is connected to the image generator 150 and determines a full intensity of symbols generated by the image generator 150.

The image intensity compensator 180 is also connected to, and receives image information from an image generation unit 160 and a virtual horizon calculator 170. The image generation unit 160 and the virtual horizon calculator 170 is connected to other aircraft systems and receives flight parameter signals from them.

Based on the flight parameter signals the virtual horizon calculator 170 calculates the position of a virtual horizon line of the head up display, corresponding to the position of the real horizon line on the head up display, as perceived by the observer, and being a good approximation thereof.

The image intensity compensator 180 then determines, based on the position in the head up display of the virtual horizon line, the intensity of flight information symbols and portions of flight information symbols generated by the image generation unit 160, and controls the image generator 150 to modulate light intensity such that such symbols and portions of such symbols appearing above the virtual horizon line are shown with full intensity, and such that symbols and portions of symbols appearing below the virtual horizon line are shown with a second intensity. The second intensity being lower than the first intensity.

The image intensity compensator 180 is thus arranged to control the image generator 150 to generate a flight information light pattern 143 corresponding to an image with an intensity distribution as described above. The flight information light pattern 143 is then combined with an outside environment light pattern 142 using head up display optics 140 arranged to show a combined image to the pilot's eye 190 as is known to a person skilled in the art of head up displays.

Figure 1B:
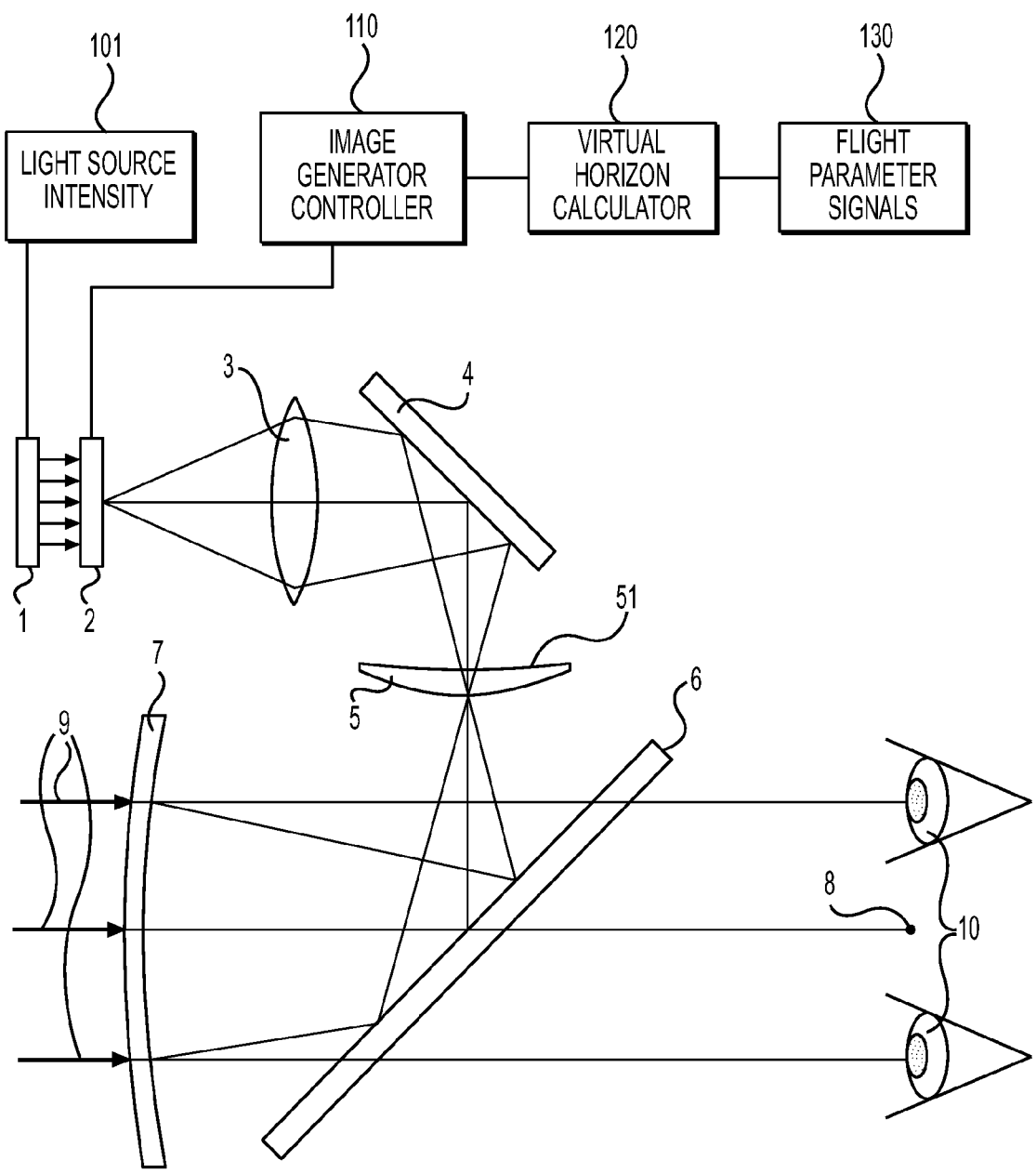
FIG. 1b shows an overview of a brightness control system for a head up display according to a second embodiment of the invention.

FIG. 1*b* shows a system layout of a display system in accordance with a second embodiment of the invention. A projector part 1, 2 comprises a light source 1 and an image generator display 2 preferably chosen among standard components, e.g., such standard components that normally form part of digital projectors. The light source 1 can e.g., be a lamp. The image generator display 2 may be of a transmitting type, for example a Liquid Crystal Display (LCD) as shown in FIG. 1, or may be of a reflecting type, for example a Digital Micro-mirror Device (DMD), available from e.g. Texas Instruments Incorporated, Texas, United States, with corresponding change of the light source 1 position.

The head-up display optics may comprise optical elements 3-7 to combine light rays of the image from the image source with light rays 9 representing the outside terrain such that a combined image reaches an observer's eyes 10. The optics may as an alternative be of some other arrangement as known by a person skilled in the art of head up displays.

The light source 1 intensity is controlled by a light source intensity unit 101 that control the intensity of the light according to ambient light conditions and/or observer settings as determined by e.g. the position of a potentiometer.

The image generator display 2 is connected to, and controlled by an image generator controller 110 that controls pixels of the image generator display thereby creating desired images and/or symbols. The image generator controller 110 is arranged to be able to control the intensity of each pixel by pulse modulation. The image generator controller 110 is connected to, and receives data representative of a position of virtual horizon from a virtual horizon calculator 120, which, based on flight parameter signals such as pitch angle and roll angle calculates the position of the horizon line in the display image to correspond to a real horizon line as would its position be perceived by the observer. The virtual horizon calculator 120 also provides information to the image generator controller as to whether a certain pixel is over or under the horizon line.

The image generator controller 110 then controls the image intensity, using pulse modulation to provide symbols above the virtual horizon with an intensity different from that of the symbols below the virtual horizon. The difference in intensity is preset. In an alternative embodiment the difference is observer adjustable by means of e.g. a potentiometer.

In still another embodiment the difference in intensity is generated as a function depending on the ambient light conditions. One or more ambient light sensors (not shown) are arranged to measure the intensity of ambient light. In a particular embodiment full intensity is set by an algorithm were full intensity is set proportional to the intensity of measured ambient light, and the difference in intensity is such that the ratio between the intensity of symbols above the horizon line and below the horizon line is fixed.

In a further embodiment intensity is set by an algorithm were an overall intensity, calculated as the mean value of the intensities for symbols above and below the horizon line, is set proportional to the intensity of measured ambient light, and the difference in intensity is set such that the ratio between the intensity of symbols above the horizon line and below the horizon line is proportional to the mean value of the intensity as mentioned above.

In yet still a further embodiment the intensity of the symbols above the horizon line is proportional to a measured intensity of a view above the horizon line and the intensity of the symbols below the horizon line is proportional to a measured intensity of a view below the horizon line.

To allow the observer/pilot to shut off the difference in intensity of symbols above and below the horizon, an on/off button is provided, that influences the image generator controller.

A further embodiment comprises a luminance control unit (not shown). The luminance of the background 9 is measured by a background luminance sensor (not shown) and the luminance of an intermediate image on a diffuser matt surface 51 is adjusted accordingly by adjusting the brightness of the image generating display 2 and/or the light source 1. Also the diameter of an aperture stop in the projection lens 3 may be varied and/or a variable attenuation filter may be used. The average brightness of the light source 1 is controlled by the luminance control unit by e.g., controlling the value of a steady current or by pulsing the current, i.e. by applying different ratios between on- and off periods. Using the above arrangement, the image a diffuser surface 51 becomes automatically adjusted in brightness such that it becomes clearly visible relative to the background, including bright sky or sunny snow. The brightness is also adjusted such that the pilot does not become blind or dazzled or otherwise influenced such that he becomes impaired in vision regarding e.g. his ability to perceive details on a runway during bad light conditions.

Figure 2:
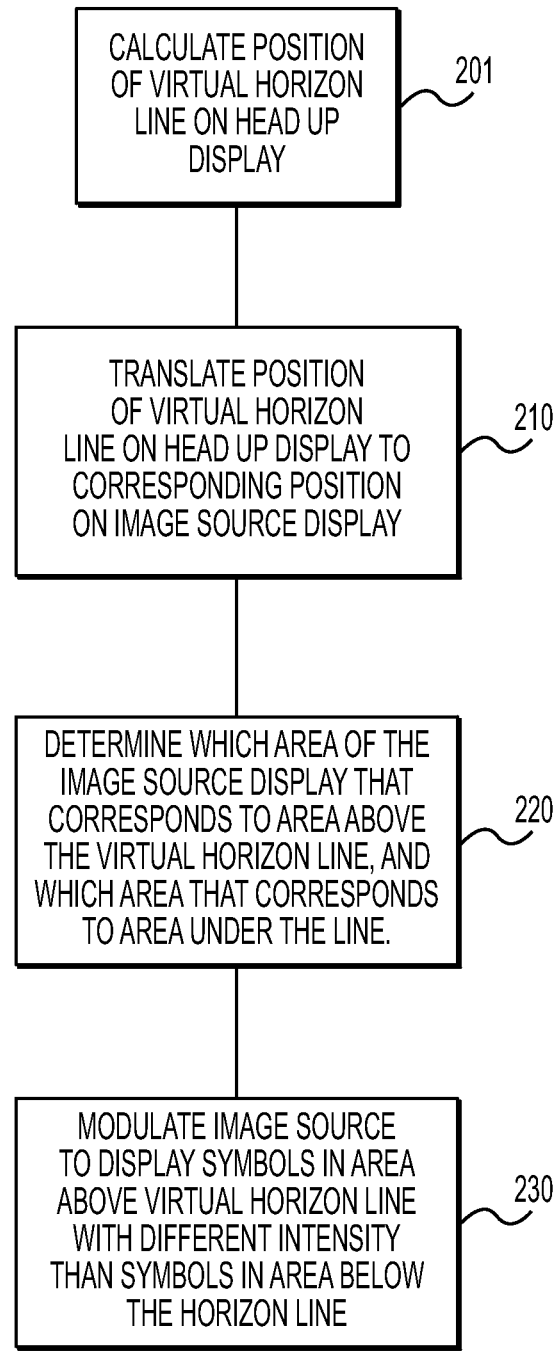
FIG. 2 is a flowchart describing principal steps of a method for controlling symbol brightness of symbols appearing on a head up display.

FIG. 2 is a flowchart describing principal steps of a method according to an embodiment of the present invention, for controlling symbol brightness of symbols appearing on a head up display. In a first step 201 of the method, a position of a virtual horizon line on the head up display is calculated. The position is calculated according to standard algorithms taking into account the current pitch and roll angles of the vehicle in which the head up display is mounted.

In a second step 210 the position of the virtual horizon line on the head up display is translated to a corresponding position on an image source display.

In a third step 220 it is determined which area of the image source display that corresponds to areas above the virtual horizon line, and which area that corresponds to areas under the line.

In a fourth step 230 the image source is modulated to display symbols in the area above the virtual horizon line with different intensity than symbols in the area below the horizon line in the image source display. The difference in intensity may be generated as a function being dependent on the ambient light conditions. In a particular embodiment full intensity is set by an algorithm were full intensity is proportional to the intensity of measured ambient light, and the difference in intensity is such that the ratio between the intensity of symbols above the horizon line and below the horizon line is fixed.

In a further embodiment intensity is set by an algorithm were an overall intensity, calculated as the mean value of the intensities for symbols above and below the horizon line, is set proportional to the intensity of measured ambient light, and the difference in intensity is set such that the ratio between the intensity of symbols above the horizon line and below the horizon line is proportional to the mean value of the intensity for symbols above and below the horizon line.

In yet still a further embodiment the intensity of the symbols above the horizon line is proportional to a measured intensity of a view above the horizon line and the intensity of the symbols below the horizon line is proportional to a measured intensity of a view below the horizon line.

The first to fourth steps are repeated continuously to account for the dynamic change of flight parameters such as pitch and roll angles.

Figure 3A:
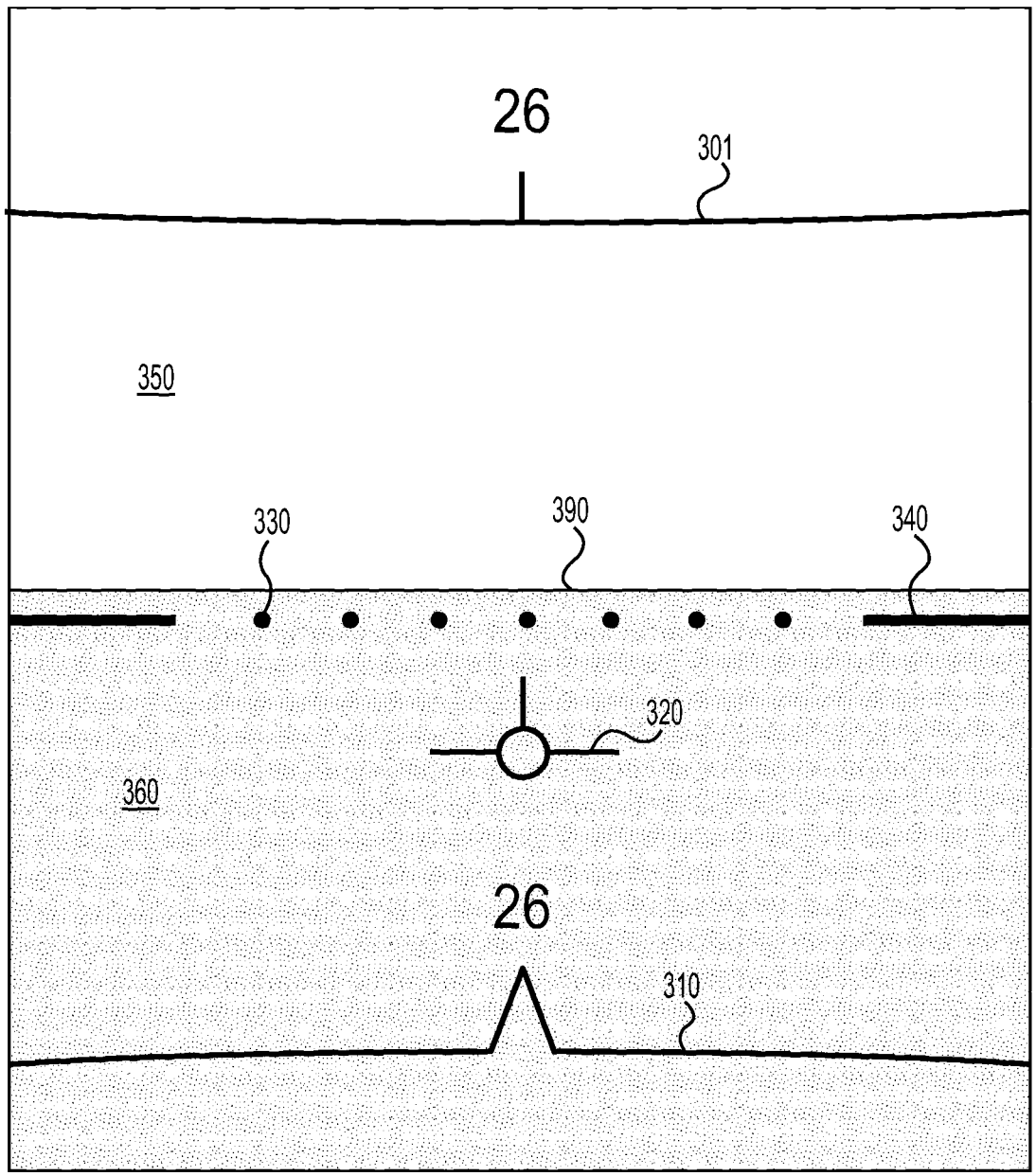
FIG. 3a is a simplified graphic outline adapted for paper of an example observer's view when looking at a head up display according to prior art during plan flight.

FIG. 3*a* shows a combined view of head up display image symbols (301, 310, 320, 330, 340 superimposed on the view of the outside world (350, 360).

Because the difficulty of reproducing such a combined view on paper suitable for reproduction as provided in the European Patent Convention, the intensity of a symbol for the purpose of the present application is represented in the figures by the width of the lines of the symbol. In order to show symbols against a background that is darker than the symbol itself, a raster technique has been used. Therefore, white symbols having different line width are appearing in the figures against a background where light raster represents the sky and heavy raster represents non-sky, e.g., ground, forest, water.

Figure 3B:
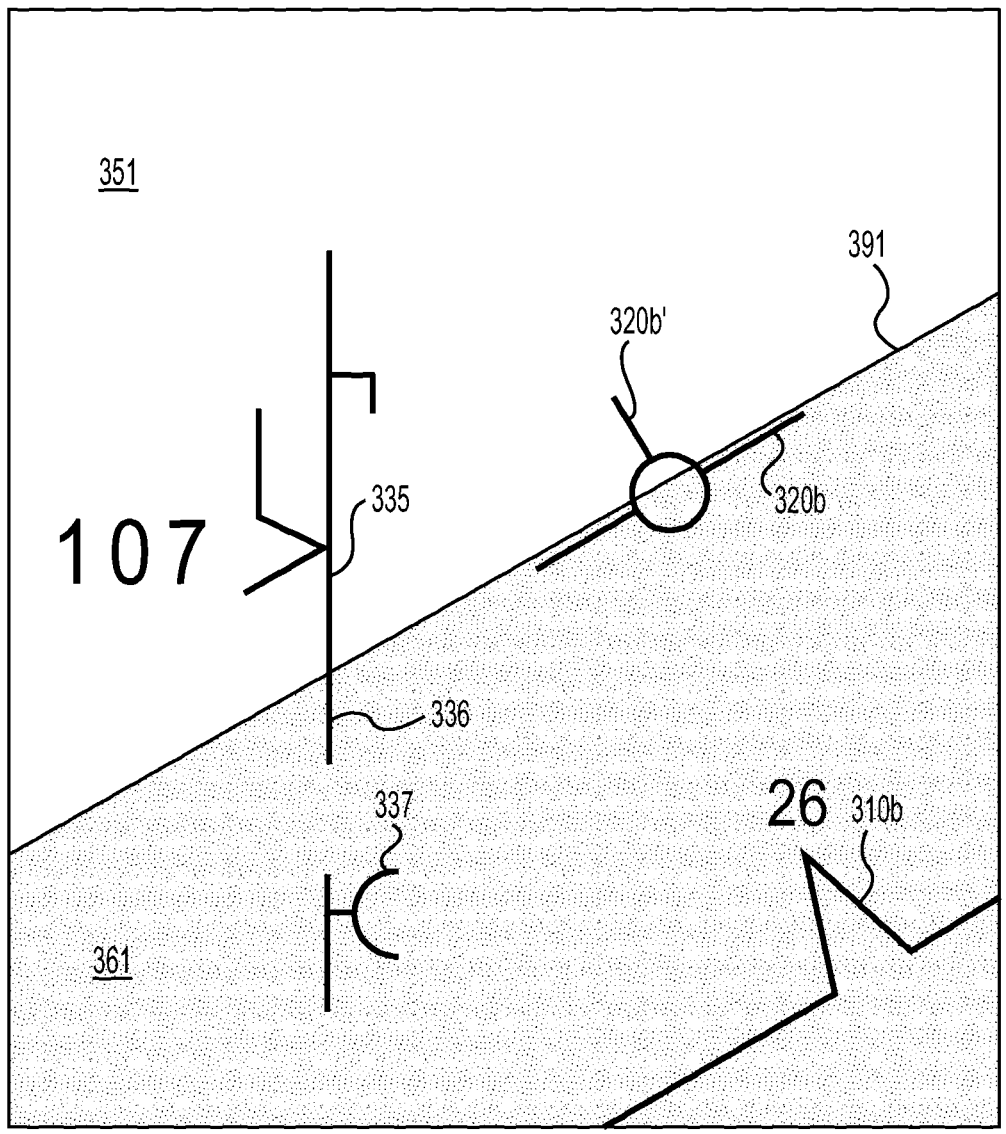
FIG. 3b is a simplified graphic outline as in FIG. 3a but as seen during a roll manoeuvre.

FIG. 3*b* shows a combined view during roll of the aircraft.

Figure 4A:
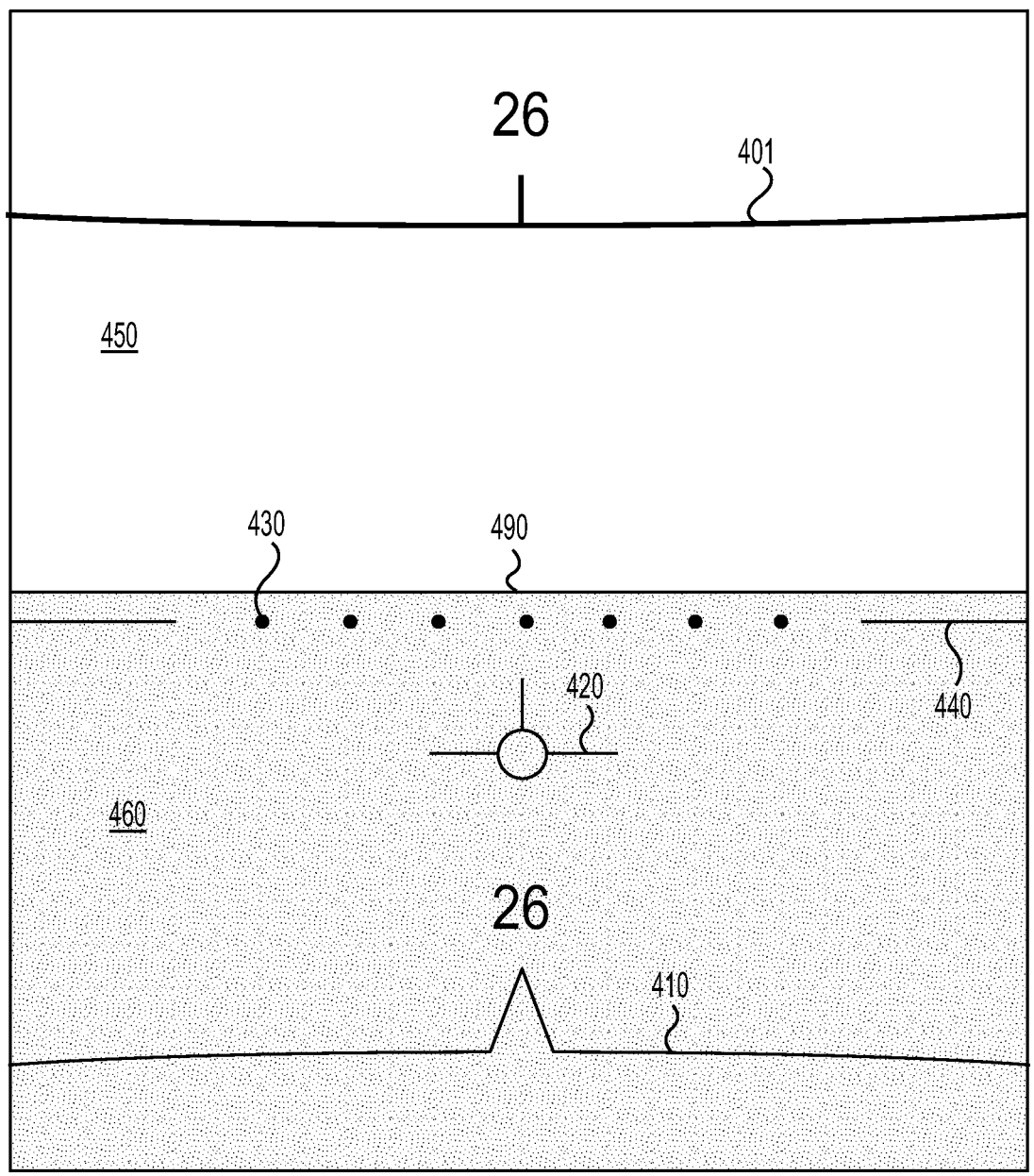
FIG. 4a is a simplified graphic outline adapted for paper of an example observer's view when looking at a head up display provided with a brightness control system according to an embodiment of the invention.
Figure 4B:
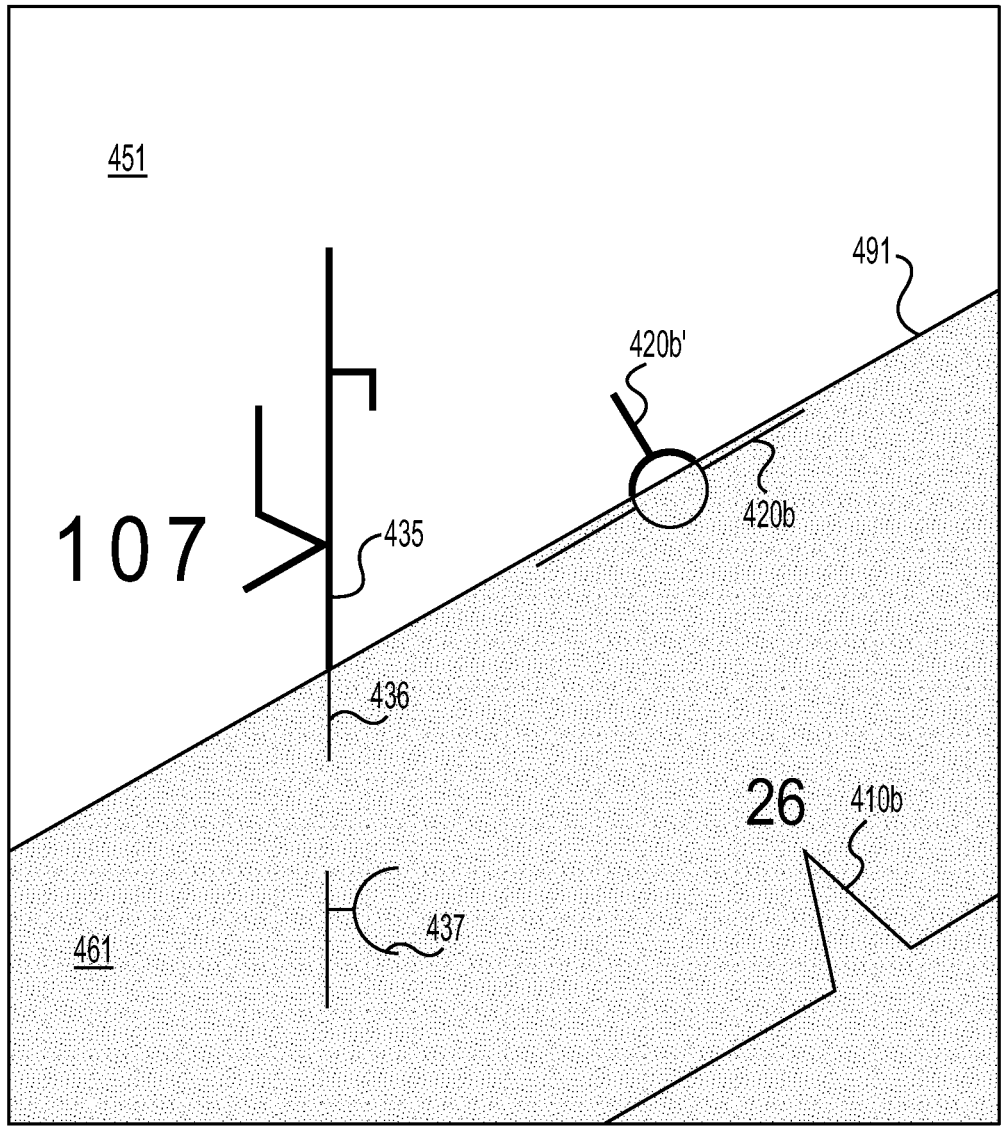
FIG. 4b is a simplified graphic outline as in FIG. 4a but as seen during a roll manoeuvre.

FIGS. 4*a* and 4*b* corresponds to the views of FIGS. 3*a* and 3*b* with the difference that FIGS. 4*a* and 4*b* represents a view generated by a head up display system according to an embodiment of the present invention. It can be seen that symbols of the views 4*a* and 4*b* are generated to display an intensity that is lower when the symbol is positioned below a virtual horizon line, which in the case of the figures is identical to the real horizon line (490, 491).

It should be noticed, for example, that symbols 301, 310, 320, 320*b*, 330, 340 of the prior art FIGS. 3*a* and 3*b* are rendered with the same intensity (corresponding to equal line thickness in the drawings) independent of whether the symbol is appearing above or below the horizon line (390, 391).

On the other hand, it should be noticed that that symbols 401, 410, 420, 420*b*, 430, 440 of the prior art FIGS. 3*a* and 3*b* are rendered with different intensity (corresponding to different line thickness in the drawings) dependent of whether the symbol is appearing above or below the horizon line (490, 491). In particular it should be noted that symbols 420*b*, 420*b*' extending both above and below the horizon line are rendered with different intensity, such that a portion of a symbol 420*b*', 435 appearing above the horizon line 490, 491 have different intensity than portions of the same symbol appearing below said horizon line.

The invention claimed is:

1. A head-up display system for a vehicle, comprising:
 a projector part positioned outside a field of view of an observer;
 a partially reflecting combiner arranged in the field of view of the observer to provide for an image of the projector part to be combined with a view of outside environment thereby providing the observer with a view of the outside environment with symbols superimposed thereto;
 a light source for providing light of the projector part;
 an image generator display for modulating the light of the light source thereby creating an image to be combined with the view of the outside environment; and
 an image generator controller having a brightness control unit arranged to provide different brightness of different portions of the image;
 wherein the brightness control unit comprises a vehicle pitch and roll angle input unit including inputs for vehicle pitch angle and roll angle, and a virtual horizon position calculator unit configured to calculate, based on said pitch and roll angles, a position in the image of a virtual horizon line, corresponding to a real horizon line as perceived by the observer, and wherein the brightness control unit comprises an upper portion identifier unit configured to calculate which portions of the image that are above said virtual horizon line, and wherein the brightness control unit comprises a lower portion identifier unit configured to calculate which portions of the image are below the virtual horizon line, and wherein the brightness control unit comprises an upper portion symbol brightness control subunit configured to control the brightness of symbols above said virtual horizon line to be different from the brightness of symbols below the virtual horizon line, thereby increasing contrast between symbols above the virtual horizon line and below the virtual horizon line and the outside environment.

2. The head up display system according to claim 1, wherein said image generator display comprises a Digital Micro-mirror Device.

3. The head up display system according to claim 2, wherein said brightness control unit is arranged to control pulse modulation of the Digital Micro-mirror Device.

4. The head up display system according to claim 1, wherein said image generator display comprises a Liquid Chrystal Display.

5. The head up display system according to claim 4, wherein said brightness control unit is arranged to control a transmittance for each pixel of the Liquid Chrystal Display.

6. A head-up display-symbol intensity control method for providing symbol intensity adjustment for symbols of a head up display for providing an observer with a view of the outside environment with symbols superimposed thereon, the method comprising:
 receiving inputs for vehicle pitch angle and roll angle;
 calculating a position of a virtual horizon line on a head up display based on the pitch angle and the roll angle, wherein the virtual horizon line corresponds to a real horizon line as perceived by an observer;
 translating the position of virtual horizon line on the head up display to a corresponding position on an image source display;

determining which area of the image source display that corresponds to an area above the virtual horizon line, and which area that corresponds to an area below the virtual horizon line;

modulating the image source to display symbols in the area above virtual horizon line with a different intensity than the image source is modulated to display symbols in the area below the horizon line, thereby increasing contrast between symbols above the virtual horizon line and below the virtual horizon line and the outside environment; and projecting the display symbols from a position outside a view of the observer on a partially reflecting combiner arranged in a field of view of the observer to provide for an image to be combined with a view of outside environment thereby providing the observer with a view of the outside environment with symbols superimposed thereto, wherein the brightness of symbols above said virtual horizon line is different from the brightness of symbols below the virtual horizon line.

7. The method according to claim 6, wherein the difference in intensity is generated as a function being dependent on ambient light conditions.

\* \* \* \* \*